Patented June 29, 1943

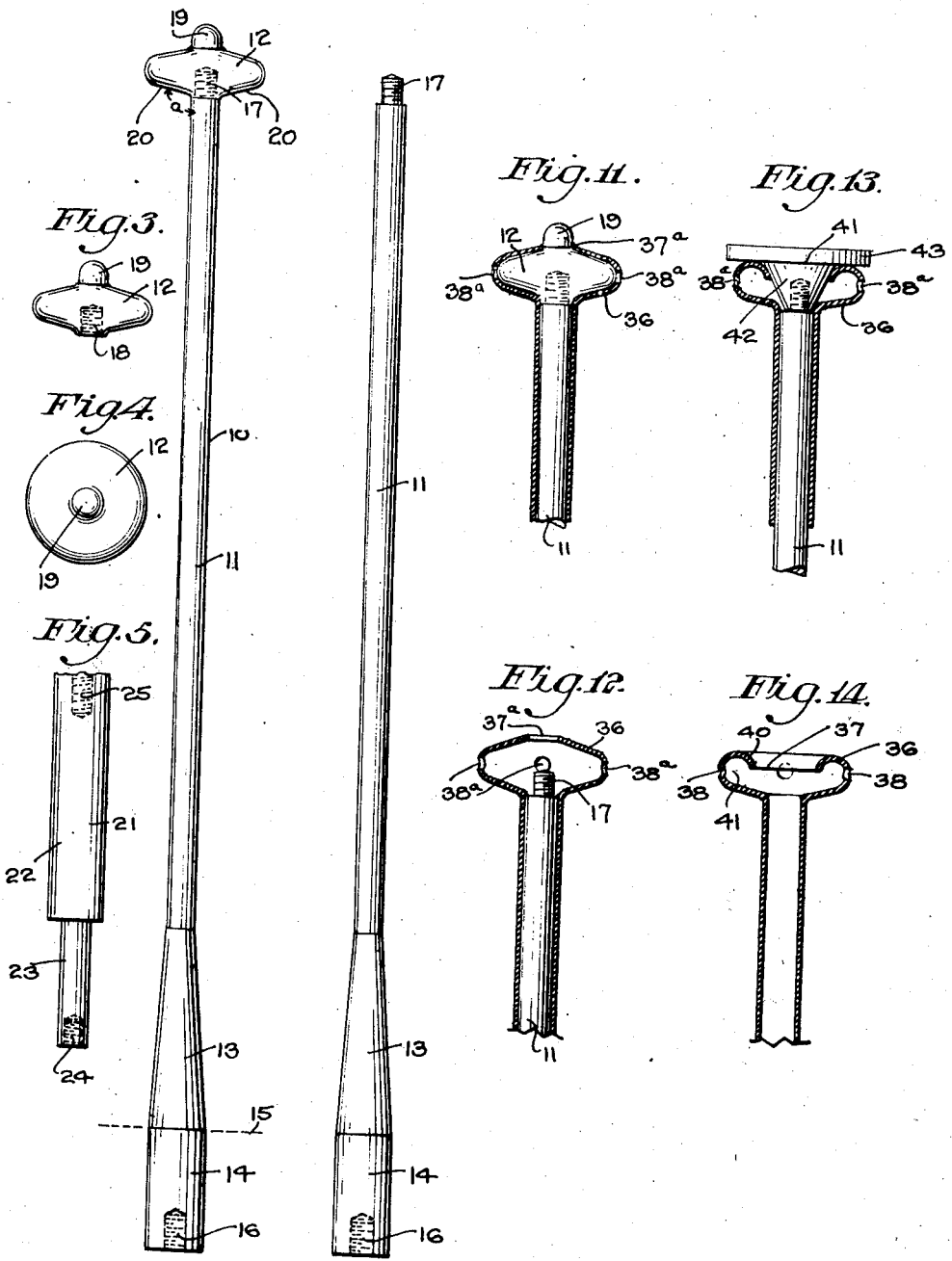

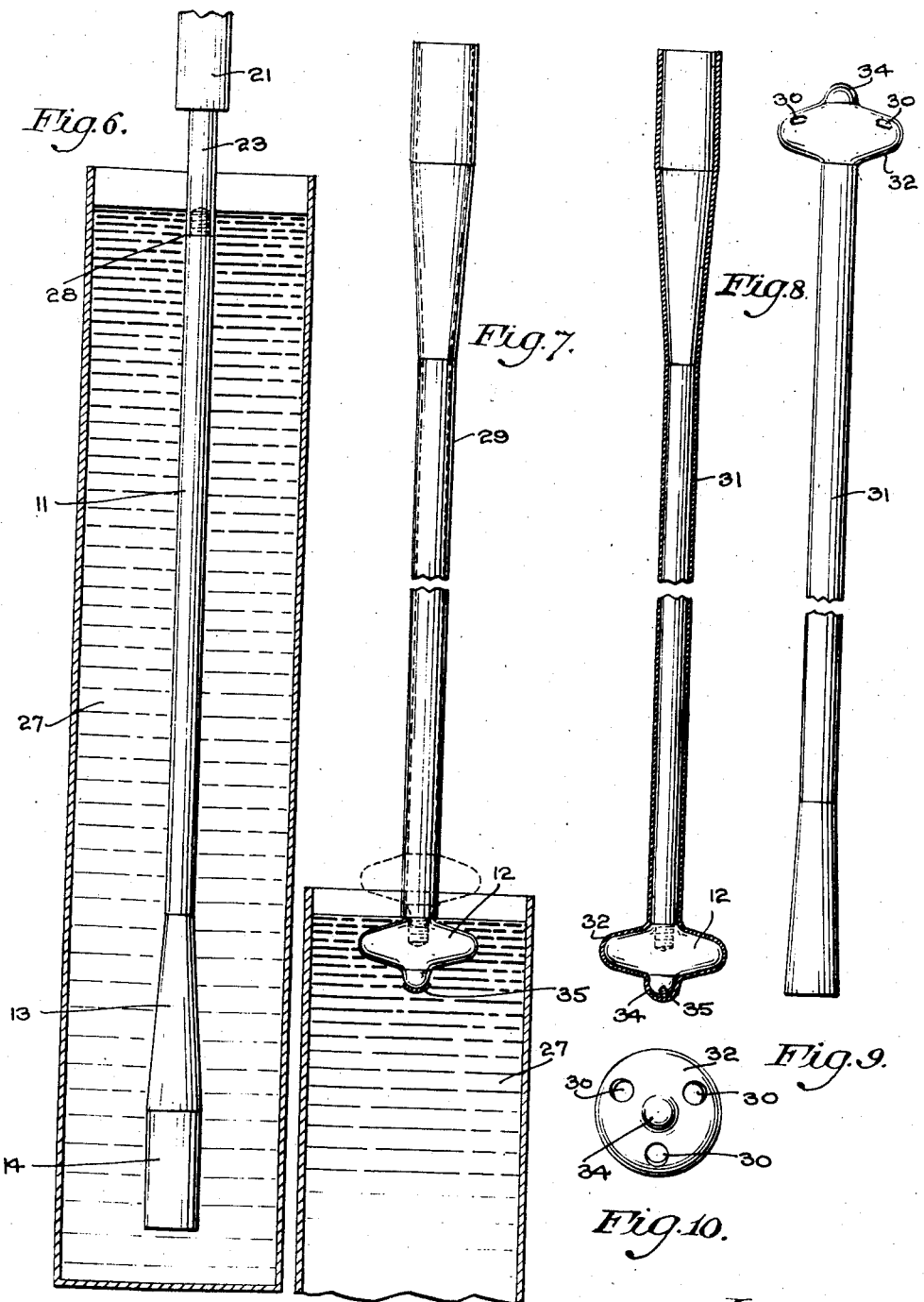

2,322,858

UNITED STATES PATENT OFFICE 2,322,858

SELF-RETAINING CATHETER

Rollin J. Limbert and Charles J. Glaser, Jr., Conshohocken, Pa., assignors to Lee Rubber & Tire Corporation, Conshohocken, Pa., a corporation of New York Application December 31, 1940, Serial No. 372,558

8 Claims. (Cl. 18—58)

This invention relates to the production of rubber self-retaining catheters or surgical drains and more particularly to an improved apparatus for and method of producing the same.

Heretofore and prior to this invention it has been the practice, in accordance with one method of procedure, to form such catheters having closed ends by the use of internal pressure molds to impart the necessary set and shape to the finished article. In such case, the catheter is preliminarily formed of three parts which are cemented together and then placed in the mold cavity to be there subjected to an internal gas pressure at the time of curing so as to expand and set the catheter to the shape of the internal cavity of the mold. Generally, the three parts of the catheter so formed consist of an extruded tubular stem of the required length, a centrally perforated disk-shaped member which is adapted to be cemented to one end of the tubular stem and a second disk-shaped member the peripheral edge of which is adapted to be cemented to the corresponding edge of the first-mentioned disk-shaped member. The disk-shaped members expand under the internal pressure applied when the cemented parts are in the mold to form a bulbous shaped head for the catheter.

In addition to the foregoing method of producing catheters, attempts have been made to produce a one-piece catheter by dipping a suitably shaped form in a bath of liquid latex or other such compound but such attempts have not been entirely successful due to the fact that because of the type of form employed and the procedural methods employed in conjunction therewith, it has not been possible heretofore to produce a catheter in which the shoulder formed between the base of the catheter head and the adjoining end of the tubular stem is sufficiently pronounced to insure retention of the catheter head in the body cavity to be drained.

It is among the objects of the present invention to produce a one-piece catheter by the use of dipping forms of such character and such manner as to provide the catheter head with a base forming a sharp angle with the catheter stem at the point of juncture of the head and stem.

A further object of the invention is to provide a catheter in which the head thereof is integrally formed with the catheter tubular stem and in which the external surface of the catheter from tip to tip thereof is uniformly smooth and free of any seams, joints, mold marks or other surface disfigurations characteristic of mold-formed multiple-part catheters.

A still further object is to provide a dipping form for catheters as well as a method of dipping procedure for producing catheters of smooth and uniformly neat appearance throughout and which facilitates and renders economical the quantity production of such catheters.

Other objects and advantages of the invention will appear more fully hereinafter, it being understood that the invention consists substantially in the combination, construction, arrangement and relative location of parts, as well as in the method of employing the same, all as is described more fully hereinafter, as shown in the accompanying drawings and as finally pointed out in the appended claims.

In the said accompanying drawings:

Figure 1 is a view showing a completely assembled dipping form for use in the production of a catheter such as is shown in Figure 10;

Figure 2 is a view of the dipping form showing the solid head removed therefrom;

Figures 3 and 4 are side elevation and top plan views, respectively, of the dipping form head;

Figure 5 is a view of the auxiliary support for the dipping form stem;

Figure 6 is a view showing the dipping form employing the auxiliary part of Figure 5 dipped into a bath of liquid latex or the like;

Figure 7 is a view showing the dipping form assembly of Figure 1 dipped into the bath to produce the head of the catheter;

Figure 8 is a view showing the dipping form removed from the bath with a film of coating material adhering to the surface thereof;

Figure 9 is a view of the catheter per se;

Figure 10 is a head end view of the catheter of Figure 9;

Figure 11 is a view showing one step in the method of producing a modified type of catheter having an open head;

Figure 13 is a view showing a subsequent step;

Figure 12 is a view similar to Figure 11 but showing the solid head of the dipping form removed;

Figure 14 is a view showing the completed modified type of open head catheter.

Referring now to the drawings and more particularly to Figures 1 to 5 thereof, it will be observed that the dipping form, designated generally by the reference character 10, employed to form the catheters in accordance with the principles of the present invention generally consists of an assembly of two main parts, namely, a main body part 11 in the form of a cylindrical rod of requisite length and a head 12 adapted for detachable securement to one end of the main stem 11. The cylindrical stem 11 of the catheter dipping form is formed at one end thereof with a tapered portion 13 of gradually increasing diameter toward its outer extremity, which tapered portion may be provided, if desired, with a cylindrical terminal part 14. In certain instances, this terminal part 14 may be omitted, in which event the outer extremity of the stem portion 11 would terminate in the plane designated generally by the dotted line 15 in Figure 1. In any case, the outer extremity of the stem is provided with an interiorly threaded socket 16 for threadedly receiving a suitable supporting element (not shown) for the dipping form.

The opposite end of the cylindrical stem 11 of the dipping form is provided with an axially projecting externally threaded stud 17 which is adapted for threaded engagement with an interiorly threaded socket 18 tapped into the bottom of the solid head 12 of the catheter dipping form. This head 18 is of generally bulbous shape and is provided upon the top side thereof with a centrally disposed rounded tip element 19 of reduced diameter, the axis of said tip element being coincident with that of the cylindrical stem 11 of the form when the head 12 is secured to the stem 11 in the assembled relation shown in Figure 1. It is important to note that the bottom or under surface 20 of the head 12 is only slightly dished so that said surface forms an angle $a$ of slightly more than 90 degrees with respect to the longitudinal axis of the dipping form. The reason for forming this sharp angle between the annular base surface 20 of the dipping form head 12 and the cylindrical surface of the dipping form stem 11 will be apparent more fully hereinafter.

Figure 5 shows an auxiliary part 21 which is adapted for use in conjunction with the stem 11 of the dipping form in carrying out certain steps in the dipping operation, it being observed that this auxiliary part 21 generally consists of a main body 22 of cylindrical shape which is provided at one end thereof with a coaxial stem 23 of reduced diameter, the outer end of this stem 23 being provided with an interiorly threaded socket 24 adapted to threadedly receive the threaded stud 17 of the stem 11. The opposite end of the part 21 is provided with an interiorly threaded socket 25 for threadedly receiving a suitable supporting element (not shown) for supporting the dipping form in the bath of the catheter-forming material, such as liquid latex or the like.

The dipping form as just described is employed in the production of a catheter, such as is shown in Figure 9, and therein designated by the reference numeral 26. In producing this catheter 26 which, it will be observed, is of one-piece construction, the parts of the dipping form respectively shown in Figures 2 and 5 are first assembled in the relationship shown in Figure 6, that is, the auxiliary part 21 is secured to the stem 11 so that the extension 23 of the auxiliary part 21 constitutes in effect a continuation of the main body stem 11 of the dipping form. It will be noted in this connection that the parts 23 and 11 are of equal diameters. Having assembled the parts 11 and 21, the assembly is dipped into a bath 27 of any suitably compounded or uncompounded natural or synthetic latex such as may be employed in the production of rubber or rubber-like articles. In this initial dipping operation, the dipping form assembly as shown in Figure 6 is submerged in the bath to a point where the joint 28 between the parts 11 and 21 is disposed below the surface level of the bath 27. Any suitable means, not shown herein, may be employed for controlling the extent to which the dipping form is dipped into the bath 27 as well as for insuring a constant surface level for said bath, it being preferred in actual practice of the present invention to provide a bath 27 of sufficient volume and exposed area to accommodate a relatively large number of dipping forms at one time.

Upon immersing the dipping form assembly into the bath 27 as shown in Figure 6, the surface of the form becomes coated with a film 29 of the liquid latex, this film becoming set upon the form when the latter is removed from the bath. In accordance with conventional and well-known practices, the forming tool may be subjected to as many individual dippings in the bath as may be desired to produce the requisite thickness in the wall of the catheter being formed, each separate dipping being followed by a drying step so as to set the material upon the form prior to again dipping or immersing it in the liquid bath, it being understood that the thickness of the material of which the catheter is formed is governed not only by the number of individual dippings to which the dipping form is subjected, but also by the viscosity of the dipping bath.

Having provided the dipping form assembly of Figure 6 with a coating or film of material of the requisite thickness, the next step in the procedure is to trim away all of the material above the joint 23 of the dipping form assembly (see Figure 6) following which the auxiliary part 21 is replaced by the head 12. The dipping form assembly is then reversed in position so as to submerge the head 12 thereof in the dipping bath 27, the extent of immersion being only such as to just about cover all of the head 12 of the dipping form and just sufficient of the coating 29 which was preliminarily formed upon the stem of the dipping form to effect an integral juncture between the material coating the stem 11 and that coating the head 12. As in the preliminary operation of coating the stem of the dipping form, any suitable means (not shown herein) may be employed for suitably controlling the extent to which the forming tool is dipped into the bath 27 when in the inverted position shown in Figure 7. Also, as in the case of forming the coating on the stem 11 of the dipping form, the head 12 may be subjected to as many individual dippings as may be desired to produce the requisite thickness in the material forming said head. Generally, the thickness of the material forming the head is the same as that of the material forming the stem of the catheter, but obviously these parts may be of relatively different thicknesses if so desired. It should be noted in this connection that in the operation of coating the head 12 of the dipping form, it is preferable not to remove the head suddenly from the bath after each dipping. Instead, the preferred practice is to preliminarily lift the head 12 out of the bath to a point such that the extremity of the tip 19 of the head is just in contact with the upper surface of the liquid bath and to retain it in such position for a length of time sufficient to permit the excess liquid material to drain from said head back into the bath. By maintaining the tip 19 of the head 12 in contact with the upper surface of the bath, proper drainage is greatly facilitated at the same time that uniformity in the thickness of the material coating the head 12 and its tip 19 is insured. This draining position of the head is indicated generally by the dotted lines of Figure 7.

Following the operation of dipping the head 12 of the dipping form to provide a coating therefor of the requisite thickness, which coating is joined to the coating 29 enveloping the stem 11 of the dipping form, the entire dipping form assembly as shown in Figure 7 is immersed in the liquid bath so as to provide the same with an overall dip. This overall dipping step may be repeated as many times as may be desired to provide a uniformly smooth external coating extending from tip to tip of the dipping form. Generally, not more than one or two of such overall dippings is necessary to provide a smooth surface for the catheter, particularly in the region where the material covering the head 12 of the dipping form is joined to the material covering the stem 11 thereof.

Following the final overall dipping operation, the dipping form with the latex adhering thereto in the form of a set film is placed in any suitable curing apparatus in order to cure the material enveloping the dipping form. Thereafter, and while the cured latex is still on the form, the material forming the head of the catheter is suitably pierced in any desired manner to provide a series of circumferentially spaced openings 30 therein, these openings serving as the drainage openings in the catheter head. Having so provided these drainage openings 30, the stem 11 of the dipping form is unthreaded from the head 12 thereof and is withdrawn from the tubular stem portion 31 of the catheter, while the head 12 is removed from the formed head 32 of the catheter by way of one of the previously formed apertures 30 therein, the material of which the catheter is formed having a stretch capacity sufficient to permit any one of the said holes 30 to be stretched open sufficiently to permit the solid head 12 of the dipping form to be ejected therethrough.

Preferably, in order to reinforce the tip of the rubber catheter against the possibility of its being pierced by the instrument which is ordinarily employed for positioning the head of the catheter in the body cavity to be drained, which instrument is generally in the form of a slender ramlike rod, the inner surface of said tip 34 is overlayed with a small piece 35 of fabric or the like. This reinforcing fabric 35 is placed over the tip 19 of the head 12 of the dipping form just prior to the operation of dipping said head in the bath 27 as shown in Figure 7 and is thus impregnated by and securely bonded to the rubber of which the catheter is formed.

The foregoing describes the procedure employed in the production of so-called closed end catheters, i. e., catheters having bulbous shaped heads which are imperforate throughout except for the drainage opening 30 as shown in Figure 9. Another catheter of the open-ended type is illustrated in Figure 14, this type being characterised in that the head 36 thereof is provided with an enlarged central aperture 37 in addition to the circumferentially spaced drainage openings 38. Also, as appears most clearly in Figure 14, the open-ended catheter is devoid of any tip element, the annular portion 39 thereof which marginally surrounds the central aperture 37 thereof being inturned, as at 40, to provide in effect an annular recess 41 in which may be collected the fluids for discharge through the tubular stem of the catheter.

In the formation of this open-ended type of catheter, exactly the same procedure is followed as in the case of the closed end type of catheter up to and including all of the steps prior to final curing of the rubber upon the form as shown in Figure 8. Thereupon, and while the tipped head 12 of the dipping form is still in place, the tip 34 (see Figure 8) of the uncured rubber enveloping said head 12 is cut off in any suitable manner, as by a die (not shown), to provide a central aperture 37ª in the uncured head of the rubber catheter. At the same time, also, the catheter head may be provided with the circumferentially spaced drainage openings 38ª.

Thereafter, the solid tipped head 12 of the dipping form is detached from the stem 11 and removed by way of the aperture 37ª, following which a forming head 41 (see Figure 13) is threadedly secured to the stem 11. It will be noted that this forming head 41 which replaces the tipped head 12 is provided with a body 42 of generally frusto-conical shape and with an annular flange 43 projecting radially from the base of said body. Also, it will be observed that whereas the solid tipped head 12 of the dipping form was disposed entirely within the catheter head, the forming head 41 is so disposed that the annular flange 43 thereof lies exteriorly of and overlies that portion of the catheter head which marginally surrounds the central apertures 37 thereof. The forming head 41 thus functions to conform the catheter head into the shape shown in Figure 13, following which the entire assembly is placed in any suitable curing apparatus in order to cure the rubber and set it into the shape of the catheter shown in Figure 14. Following this curing operation, the cured catheter may be readily stripped from its supporting and form-sustaining body as the finished article.

It will be observed that both forms of catheter described herein (see Figures 9 and 14) are characterised by the provision of a head having a relatively broad base extending radially from the tubular stem of the catheter at an angle closely approaching 90 degrees. This relatively sharp angle between the base of the catheter head and the stem of the catheter provides a pronounced annular shoulder at the point of junction of the catheter stem and head which serves to securely hold the head in position within the body cavity into which the head is inserted following a surgical or other operation requiring subsequent drainage of the body fluids. Heretofore and prior to this invention, it has not been possible to obtain any such sharply defined shoulder at the base of the catheter head except possibly in a catheter molded of several parts separately formed and cemented together.

It will be understood, of course, that the present invention is susceptible of various changes and modifications which may be made from time to time and, accordingly, it is intended to claim the same broadly, as well as specifically, as indicated in the appended claims.

What is claimed as new and useful is:

1. A method of forming Pezzer type catheters of rubber or the like which consists in initially immersing a cylindrical stem in a bath of liquid rubber or the like to provide the same with a coating of predetermined thickness, in then removing a portion of said coating to limit it to predetermined length, in affixing a bulbous head to said stem in axial alinement therewith and in immediately adjoining relation to the end of the coating from which a portion had been removed, in reversing said stem and immersing the headed end thereof in said bath whereby to provide said head with a coating contiguous with that of said stem and of predetermined thickness, and in subsequently drying and curing said coating upon said headed form preliminarily to removal of the coating therefrom as the completed catheter.

2. A method of forming Pezzer type catheters of rubber or the like which consists in initially immersing a cylindrical setem in a bath of liquid rubber or the like as many individual times as necessary to provide the same with a coating of predetermined thickness, in drying said coating between each immersion of said stem in the bath, in trimming said coating to requisite length, in fitting the trimmed end of said stem with a forming element for the catheter head, in immersing the headed end of the dipping form into said bath as many individual times as necessary to provide the same with a coating of requisite thickness contiguous with that of said stem, in drying the coating on said head between each immersion thereof in the bath, and in subsequently drying and curing said coating upon the form preliminarily to removal of the coating therefrom as the completed catheter.

3. A method of forming Pezzer type catheters as defined in claim 2 wherein the final immersion in the bath of the headed end of the dipping form is followed by an overall immersion of the complete dipping form.

4. A method of forming Pezzer type catheters as defined in claim 2 which includes as an intermediate step preliminary to the final drying and curing operation of subjecting the dipping form to an overall immersion in said bath.

5. A method of forming Pezzer type catheters as defined in claim 2 wherein during each operation of dipping the form head-end into the coating bath, upon removal of the form from the bath, the tip of the head is permitted to remain in contact with the bath material for a short interval of time prior to complete removal therefrom.

6. A method of forming Pezzer type catheters as defined in claim 2 wherein during each operation of dipping the form head-end into the coating bath, upon removal of the form from the bath, the tip of the head is permitted to remain in contact with the bath material for a time interval sufficient to drain excess coating material from the head.

7. A method of forming closed end Pezzer type catheters which consists in initially immersing a cylindrical stem in a bath of liquid rubber or the like as frequently as necessary to provide the same with a coating of predetermined thickness, in drying said coating upon the stem after each separate immersion in the bath, in trimming the coating on the stem to a predetermined length, in immersing said stem, when fitted with a head forming element, head-first into said bath as frequently as necessary to provide said head with a coating of requisite thickness contiguous with the trimmed-to-length coating on the stem, in drying the coating on the head after each immersion, in perforating the head while the coating is still on the form, and in subsequently drying and curing said coating upon the form preliminarily to stripping the coating therefrom as the completed cathether.

8. A method of forming an open end Pezzer type catheter which consists in initially immersing a cylindrical stem in a bath of liquid rubber or the like as frequently as necessary to provide the same with a coating of predetermined thickness, in drying said coating upon the stem after each separate immersion in the bath, in trimming the coating on the stem to a predetermined length, in immersing said stem, when fitted with a head-forming element, head-first in said bath as frequently as necessary to provide said head with a coating of requisite thickness contiguous with the trimmed-to-length coating on said stem, in drying the coating on said head after each immersion, in removing the tip of the formed catheter head to provide a central perforation therein, in replacing the head-forming element with a member adapted to overlie and turn inwardly the free marginal edges of said perforation, and in subsequently drying and curing said coating upon the form preliminarily to stripping the coating therefrom as the completed catheter.

ROLLIN J. LIMBERT.
CHARLES J. GLASER, Jr.